June 1, 1954 R. A. MacDONALD 2,679,774
METHOD OF MAKING LOCK BOLTS
Original Filed Dec. 28, 1945

INVENTOR
Roderic A. MacDonald
BY
Pennie, Edmonds, Morton and Barrows
ATTORNEYS

UNITED STATES PATENT OFFICE 2,679,774

METHOD OF MAKING LOCK BOLTS

Roderic A. MacDonald, Greenwich, Conn., assignor to Russell, Burdsall and Ward Bolt and Nut Company, Port Chester, N. Y., a corporation of New York Original application December 28, 1945, Serial No. 637,578. Divided and this application October 24, 1950, Serial No. 191,835

3 Claims. (Cl. 80—61)

This invention relates to a method of making locking bolts and more particularly to a method of forming locking threads on the shank of a bolt. This application is a division of my copending application, Serial No. 637,578 filed December 28, 1945, now abandoned.

An object of the invention is the provision of a bolt having locking threads that will engage the threads of a tapped opening with sufficient friction to prevent accidental loosening of the bolt, by vibration or otherwise, but which can be loosened or tightened by means of a wrench without damaging the threads of the bolt or the threaded opening.

Various proposals have heretofore been made for providing a bolt with locking threads at the inner end of the threaded portion of the shank to permit the bolt to be hand tightened until the last few threads engage the tapped hole and to be finally tightened by means of a wrench. Such proposals have been open to one or more objections. In some instances the locking threads are of such form or character that either the threads of the bolt or the threads of the tapped opening are injured or mutilated when the bolt is tightened, thus preventing reuse of either member. In other instances, the locking threads are so formed that they require special manufacturing operations, thereby making the cost of the bolt too great to compete with standard bolts produced by standard production methods.

In carrying out my invention, I provide a bolt having locking threads at the inner end of the threaded portion of the shank. The threads may be either standard U. S. threads or V-threads provided with extensions at their crests or the threads may be slightly wider at the crests than the standard threads. The extensions on the threads of the bolt occupy the space normally provided for clearance at the bottom of the threads of the tapped hole when the bolt is in place and by forming these extensions of any size, the desired friction for locking the bolt in place can be obtained. A bolt so threaded is efficiently locked against accidental removal due to vibration and the like but at the same time can be tightened or loosened with a wrench without damaging either the threads of the bolt or the threads of the tapped hole.

An important feature of the invention is the construction of a locking bolt which may be threaded by means of circular or reciprocating roll thread dies in the same manner as a bolt having normal threads, thus requiring no extra operations. The desired construction is produced by providing a die having several threads specially shaped and, when necessary, providing a bolt blank having a portion of greater diameter than normal to provide the extra material to be rolled into the extensions on the locking threads. Thus, the special teeth of the die are capable of rolling the special thread and the material is available in the bolt blank for producing the special thread.

In the accompanying drawing I have shown several embodiments of the invention. In this showing:

Figure 1:
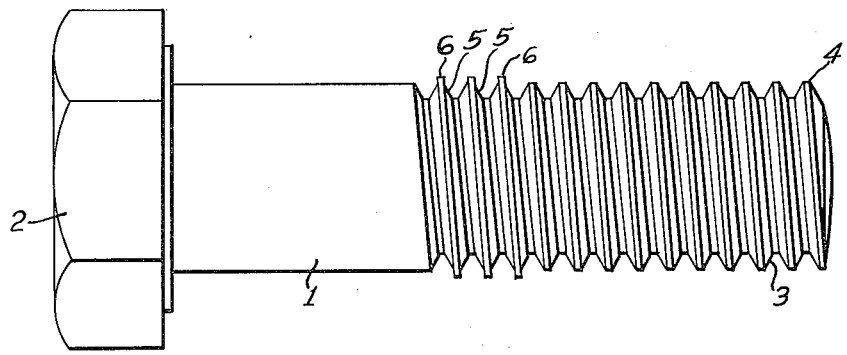
Fig. 1 is a side elevation of a bolt having three locking threads of one form at the inner end of the threaded portion of the shank.
Figure 2:
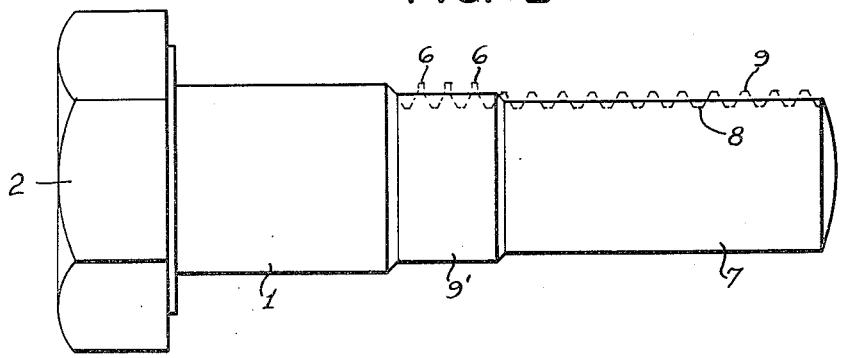
Fig. 2 is a side elevation of a blank from which the bolt of Fig. 1 is made and showing, in dotted lines, the teeth formed by the roll thread die.
Figure 3:
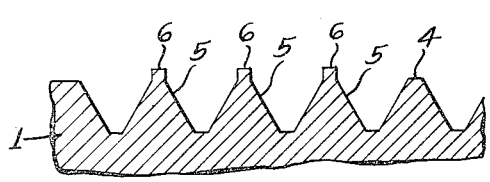
Fig. 3 is a sectional view illustrating the enlargement of the threads of the bolt of Fig. 1.

Referring to Figs. 1 to 3 of the drawing, the reference numeral 1 designates the shank of a bolt having the usual head 2 and provided with threads 3 at one end. Adjacent the end of the bolt the threads shown are the standard U. S. thread having crests 4 of the same diameter as the diameter of the unthreaded portion of the shank 1. The last two or three threads on the inner end of the bolt designated as 5 are provided with extensions 6 on the crest which, as shown, extend outwardly beyond the shank portion or are of greater diameter than the shank portion. The construction of these extensions is shown in greater detail in the enlarged view, Fig. 3. As shown, the unthreaded portion of the shank 1 and the normal threads 4 are of substantially the same diameter whereas the threads 5 are provided with extensions 6 extending outwardly beyond the diameter of the rest of the bolt.

The bolt shown in Figs. 1 and 3 is formed from a blank, shown in Fig. 2. Normally the unthreaded portion 1 of the bolt is of greater diameter than the threaded shank portion 7 and the material from the bottom of the teeth indicated at 8 is rolled by dies to form the crests 9 of the teeth. By having the proper difference in diameter between the unthreaded portion 1 and the portion 7 to be threaded, there is just sufficient material present to roll the threads 4 of a diameter equal to the diameter of the bolt. To construct a bolt such as shown in Figs. 1 and 3 without special operations, I provide a blank in which a portion 9' at the inner end of the portion 7 is of slightly greater diameter to provide the necessary material to form the extensions 6 on the crests of the teeth when the threads are rolled. The teeth of the die are, of course, properly shaped to form these extensions on the first two or three threads.

Figure 4:
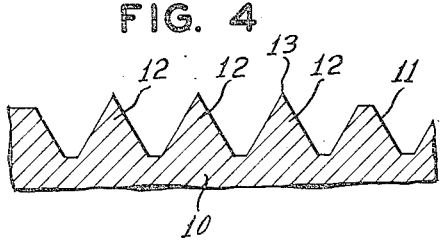
Fig. 4 is a view similar to Fig. 3 showing the application of the invention to V-threads.

Fig. 4 of the drawing illustrates another embodiment of the invention in which a bolt 10 is provided with normal threads 11 throughout the greater portion of its length and at the inner end of the threaded portion I provide two or three teeth 12 having V-shaped extensions 13 at their crests. Such a bolt is manufactured in the manner heretofore described, except that the special teeth of the roll thread die are properly shaped to form the V-shaped extensions 13 instead of the extensions 6 heretofore described.

Figure 5:
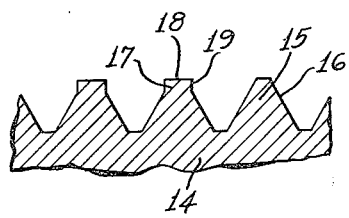
Fig. 5 is a similar view showing a standard U. S. thread with an enlargement of a different type from that shown in Figs. 1 to 3.

Fig. 5 of the drawing illustrates another form of the invention in which I provide a bolt 14 having normal threads 15. Instead of providing extensions on the crests of the teeth extending beyond the normal diameter of the bolt, the upper portion of the side of each tooth is shaped to provide sufficient excess to engage the threads of the tapped hole with the desired friction. As shown, the side wall 16 of the normal tooth is continuous from the bottom of the tooth to the crest whereas the locking teeth 17 are wider at the crest as indicated at 18 providing excess material 19 on each side of the tooth.

By either of the forms illustrated, a locking bolt is provided in which the extension or excess material fills or partially fills the clearance normally provided at the bottom of the thread which receives the threads of the bolt and thus exerts sufficient friction to effectively hold the bolt in place.

I claim:

1. The method of making a locking bolt which comprises providing a shank having a portion of largest diameter adjacent one end, an intermediate portion of an intermediate diameter and the opposite end portion of smallest diameter, and rolling threads on the portions of smallest diameter and intermediate diameter to produce normal threads on the portion of smallest diameter and a plurality of threads having extensions at their crests on the portion of intermediate diameter.

2. The method of making a locking bolt which comprises providing a shank having a portion of largest diameter adjacent one end, an intermediate portion of an intermediate diameter and the opposite end portion of smallest diameter, and rolling threads on the portions of smallest diameter and intermediate diameter to produce normal threads on the portion of smallest diameter and a plurality of threads having extensions at their crests on the portion of intermediate diameter, the crests of the extensions projecting beyond the unthreaded portion of the bolt.

3. The method of making a locking bolt which comprises providing a shank having a portion of largest diameter adjacent one end, an intermediate portion of an intermediate diameter and the opposite end portion of smallest diameter, and rolling threads on the portions of smallest diameter and intermediate diameter to produce normal threads on the portion of smallest diameter and a plurality of locking threads having enlargements adjacent their crests on the portion of intermediate diameter, the dimensions of the locking threads being otherwise the dimensions of the other threads.

References Cited in the file of this patent

UNITED STATES PATENTS

| Number | Name | Date |
|---|---|---|
| 1,064,546 | Ryan | June 10, 1913 |
| 2,116,036 | Money | May 3, 1938 |
| 2,179,157 | MacDonald | Nov. 7, 1939 |
| 2,380,944 | Cole | Aug. 7, 1945 |